US012713443B2

(12) United States Patent
Sun et al.

(10) Patent No.: US 12,713,443 B2
(45) Date of Patent: Aug. 18, 2026

(54) METHOD FOR TRANSMISSION PARAMETER OF UPLINK CHANNEL, TERMINAL, AND NETWORK SIDE DEVICE

(71) Applicant: VIVO MOBILE COMMUNICATION CO., LTD., Guangdong (CN)

(72) Inventors: Rongrong Sun, Guangdong (CN); Hao Liu, Guangdong (CN); Peng Sun, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 309 days.

(21) Appl. No.: 18/497,146

(22) Filed: Oct. 30, 2023

(65) Prior Publication Data

US 2024/0137951 A1 Apr. 25, 2024
US 2024/0237024 A9 Jul. 11, 2024

Related U.S. Application Data

(63) Continuation of application No. PCT/CN2022/088740, filed on Apr. 24, 2022.

(30) Foreign Application Priority Data

Apr. 29, 2021 (CN) ........................ 202110477883.5

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01)

(58) Field of Classification Search
CPC .. H04W 72/23; H04W 72/232; H04K 5/0048; H04L 5/94
See application file for complete search history.

(56) References Cited

U.S. PATENT DOCUMENTS 12,317,255 B2 * 5/2025 Kang ................ H04W 72/1268
2019/0174527 A1 * 6/2019 Park ...................... H04L 5/0046
(Continued)

FOREIGN PATENT DOCUMENTS

CN 107872267 A 4/2018
WO 2020155362 A1 8/2020
(Continued)

OTHER PUBLICATIONS

International Search Report and Written Opinion for Application No. PCT /CN2022/088740, dated Jul. 20, 2022, 8 Pages.
(Continued)

*Primary Examiner* — Shukri Taha
(74) *Attorney, Agent, or Firm* — Foley & Lardner LLP

(57) ABSTRACT

A method for a transmission parameter of an uplink channel, a terminal, and a network side device, and pertains to the field of wireless communication technologies. The method includes: obtaining, by a terminal, configuration information; and determining, according to the configuration information and detected first target DCI, a transmission parameter of a target uplink channel scheduled by the first target DCI, where the configuration information is used to indicate any one of the following: SRS resource sets configured for different DCI formats, where the SRS resource set is used for codebook-based transmission or non-codebook-based transmission; a first instruction associated with a first resource; parameter information of the different DCI formats, where the parameter information includes at least one of the following: whether a target field exists, whether a second one field of the target field exists, and a size of the target field; and a configured grant.

20 Claims, 6 Drawing Sheets

(56) References Cited

U.S. PATENT DOCUMENTS

| | | | |
|---|---|---|---|
| 2020/0120652 A1 | 4/2020 | Shen | |
| 2020/0145156 A1 | 5/2020 | Chen et al. | |
| 2020/0314763 A1 | 10/2020 | Cheng et al. | |
| 2021/0045119 A1 | 2/2021 | Song et al. | |
| 2022/0039122 A1* | 2/2022 | Park | H04W 74/0841 |
| 2023/0070564 A1* | 3/2023 | Chung | H04L 1/189 |

FOREIGN PATENT DOCUMENTS

| | | |
|---|---|---|
| WO | 2022120794 A1 | 6/2022 |
| WO | 2023056148 A1 | 4/2023 |

OTHER PUBLICATIONS

Ericsson "UL Signals and Channels" 3GPP TSG RAN WG 1 Meeting 100 e, e-Meeting, Mar. 2020, R1 2000825, 10 Pages.

Huawei, HiSilicon. Enhancements on multi-TRP for reliability and robustness in Rel-17. 3GPPTSG RAN WGI Meeting #104bis-e. RI-2102334. Online. Apr. 2021. 15 pages.

European Search Report for Application No. 22794812.2, mailed Oct. 8, 2024, 11 pages.

* cited by examiner

METHOD FOR TRANSMISSION PARAMETER OF UPLINK CHANNEL, TERMINAL, AND NETWORK SIDE DEVICE

CROSS-REFERENCE TO RELATED APPLICATIONS

This application is a continuation of PCT Application No. PCT/CN2022/088740 filed on Apr. 24, 2022, which claims priority to Chinese patent application No. 202110477883.5 filed on Apr. 29, 2021, which are incorporated herein by reference in their entireties.

TECHNICAL FIELD

This application relates to the field of wireless communication technologies, and specifically relates to a method for a transmission parameter of an uplink channel, a terminal, and a network side device.

BACKGROUND

In a multi-transmission reception point (TRP) scenario, different transmission occasions of a physical uplink shared channel (PUSCH) may be used for different TRP transmission by using different parameters (for example, a spatial relationship and a power control parameter), to resist blockage of a radio link and further improve reliability of data transmission. In a current technical solution, when a plurality of sounding reference signal (SRS) resource sets used for codebook or non-codebook transmission are configured for a terminal by using higher layer signaling, the terminal may work in a multi-TRP scenario. In the multi-TRP scenario, multi-TRP transmission or single TRP transmission may be scheduled by using downlink control information (DCI). Therefore, how to indicate a transmission parameter for an uplink channel scheduled by DCI, so as to reduce DCI overheads is a technical problem that currently needs to be resolved.

SUMMARY

According to a first aspect, a method for determining a transmission parameter of an uplink channel is provided, including: obtaining, by a terminal, configuration information; and determining, by the terminal according to the configuration information and detected first target downlink control information DCI, a transmission parameter of a target uplink channel scheduled by the first target DCI, where the configuration information is used to indicate any one of the following: sounding reference signal SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

According to a second aspect, an apparatus for determining a transmission parameter of an uplink channel is provided, including an obtaining module, configured to obtain configuration information; and a determining module, configured to determine, according to the configuration information and detected first target downlink control information DCI, a transmission parameter of a target uplink channel scheduled by the first target DCI, where the configuration information is used to indicate any one of the following: sounding reference signal SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

According to a third aspect, a DCI parsing method is provided, including: receiving, by a terminal, second target DCI, where a target BWP indicated by a bandwidth part BWP indicator field in the second target DCI is not an activated BWP; and parsing, by the terminal, a target field in the second target DCI according to a quantity X of target fields included in the second target DCI and a quantity Y of target fields that need to be interpreted for scheduling the target BWP, where X and Y are integers greater than or equal to 0.

According to a fourth aspect, a DCI parsing apparatus is provided, including: a receiving module, configured to receive second target DCI, where a target BWP indicated by a bandwidth part BWP indicator field in the second target DCI is not an activated BWP; and a parsing module, configured to parse a target field in the second target DCI according to a quantity X of target fields included in the second target DCI and a quantity Y of target fields that need to be interpreted for scheduling the target BWP, where X and Y are integers greater than or equal to 0.

According to a fifth aspect, a scheduling method is provided, including: sending, by a network side device, configuration information to a terminal; and sending first target DCI to the terminal according to the configuration information and a transmission parameter of a to-be-scheduled target uplink channel, where the first target DCI is used to schedule the target uplink channel, where the configuration information is used to indicate any one of the following: sounding reference signal SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

According to a sixth aspect, a scheduling apparatus is provided, including a configuration module, configured to send configuration information to a terminal; and a scheduling module, configured to send first target DCI to the terminal according to the configuration information and a transmission parameter of a to-be-scheduled target uplink channel, where the first target DCI is used to schedule the target uplink channel, where the configuration information is used to indicate any one of the following: sounding reference signal SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

According to a seventh aspect, a terminal is provided. The terminal includes a processor, a memory, and a program or an instruction that is stored in the memory and that can be run on the processor, where the program or the instruction is executed by the processor to implement the steps of the method in the first aspect or the steps of the method in the third aspect.

According to an eighth aspect, a terminal is provided, including a processor and a communication interface, where the processor is configured to implement the steps of the method in the first aspect, or the steps of the method in the third aspect, and the communication interface is configured to communicate with an external communication device.

According to a ninth aspect, a network side device is provided. The network side device includes a processor, a memory, and a program or an instruction that is stored in the memory and that can be run on the processor, where the program or the instruction is executed by the processor to implement the steps of the method in the fifth aspect.

According to a tenth aspect, a network side device is provided, including a processor and a communication interface, where the processor is configured to implement the steps of the method in the fifth aspect, and the communication interface is configured to communicate with an external communication device.

According to an eleventh aspect, a readable storage medium is provided. The readable storage medium stores a program or an instruction, and the program or the instruction is executed by a processor to implement the steps of the method in the first aspect, the steps of the method in the third aspect, or the steps of the method in the fifth aspect.

According to a twelfth aspect, a chip is provided. The chip includes a processor and a communication interface, where the communication interface is coupled to the processor, and the processor is configured to run a program or an instruction to implement the steps of the method in the first aspect, the steps of the method in the third aspect, or the steps of the method in the fifth aspect.

According to a thirteenth aspect, a computer program/program product is provided. The computer program/program product is stored in a non-transient storage medium, and the program/program product is executed by at least one processor to implement the steps of the method in the first aspect, the steps of the method in the third aspect, or the steps of the method in the fifth aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a $6^{th}$ generation (6G) communications system.

Figure 1:
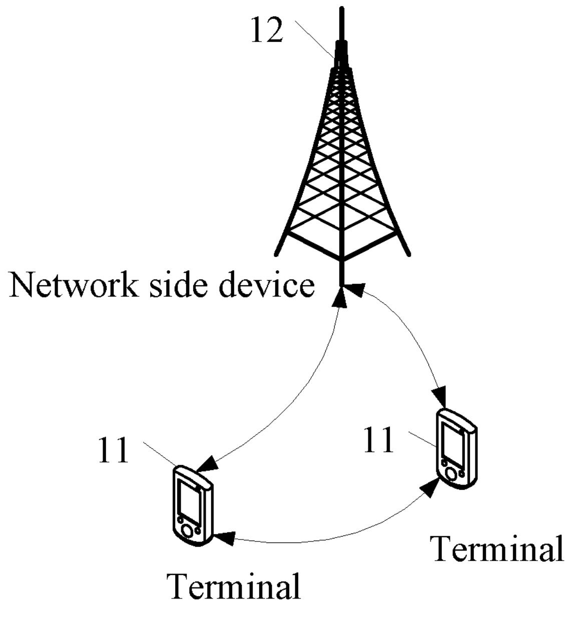
FIG. 1 is a schematic diagram of a wireless communication system to which the embodiments of this application can be applied.

FIG. 1 is a schematic diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smart watch, a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the technical solutions provided in the embodiments of this application are described in detail by using some embodiments and application scenarios thereof.

Figure 2:
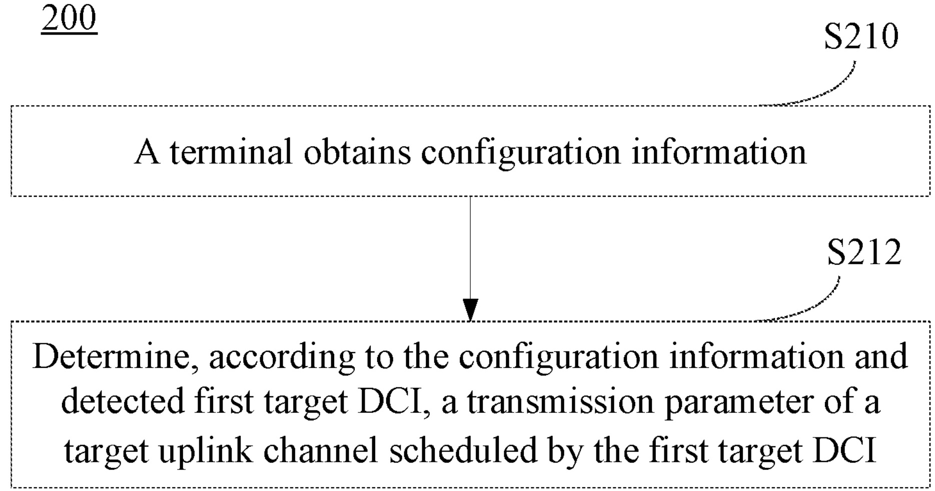
FIG. 2 is a flowchart of a method for determining a transmission parameter of an uplink channel according to an embodiment of this application.

FIG. 2 is a schematic flowchart of a method for determining a transmission parameter of an uplink channel according to an embodiment of this application. The method 200 may be performed by a terminal. In other words, the method may be performed by software or hardware installed in the terminal. As shown in FIG. 2, the method may include the following steps:

S210: A terminal obtains configuration information.

In this embodiment of this application, optionally, the configuration information is used to indicate any one of the following (1) to (4):

(1) SRS resource sets configured for different DCI formats, where the SRS resource set is used for codebook-based transmission or non-codebook-based transmissions (for example, PUSCH transmission).

The SRS resource sets configured for the different DCI formats include at least one first SRS resource set configured for a first DCI format and/or at least one second SRS resource set configured for a second DCI format.

For example, the SRS resource sets configured for the different DCI formats may include at least one first SRS resource set configured for DCI format 0_1 and/or at least one second SRS resource set configured for DCI format 0_2.

Optionally, in a case that an index of the first SRS resource set is the same as an index of the second SRS resource set, a first index set is included in a second index set, where the first index set is an index set of an SRS resource configured in the first SRS resource set, and the second index set is an index set of an SRS resource configured in the second SRS resource set; or the first index set is an index set of an SRS resource configured in the second SRS resource set, and the second index set is an index set of an SRS resource configured in the first SRS resource set.

In other words, if an index of the first SRS resource set configured in DCI format 0_1 is the same as an index of the second SRS resource set configured in DCI format 0_2, the SRS resource configured in the first SRS resource set may be included in the SRS resource configured in the second SRS resource set, that is, the index set of the SRS resource in the first SRS resource set is a subset of the index set of the SRS resource in the second SRS resource set, that is, the index set of the SRS resource in the first SRS resource set is totally the same as the index set of the SRS resource in the second SRS resource set, or the index of the SRS resource in the first SRS resource set is a part of the index set of the SRS resource in the second SRS resource set. On the contrary, the SRS resource configured in the second SRS resource set may be included in the SRS resource configured in the first SRS resource set, that is, the index set of the SRS resource in the second SRS resource set is a subset of the index set of the SRS resource in the first SRS resource set.

Optionally, in a case that an index of the first SRS resource set is the same as an index of the second SRS resource set, a first parameter of the first SRS resource set is the same as a first parameter of the second SRS resource set, where the first parameter is a parameter other than an index of an SRS resource in a configuration parameter of an SRS resource set. Other parameters include but are not limited to a power control parameter and the like.

Optionally, an index set of the at least one second SRS resource set is included in an index set of the at least one first SRS resource set.

For example, two SRS resource sets used for a codebook: an SRS resource set 1 and an SRS resource set 2, are configured for DCI format 0_1, and one SRS resource set used for a codebook: the SRS resource set 1, is configured for DCI format 0_2.

Alternatively, an index set of the at least one first SRS resource set is included in an index set of the at least one second SRS resource set.

For example, two SRS resource sets used for a codebook: an SRS resource set 1 and an SRS resource set 2, are configured for DCI format 0_2, and one SRS resource set used for a codebook: the SRS resource set 1, is configured for DCI format 0_1.

Optionally, in a case that the SRS resource sets configured for the different DCI formats include only the first SRS resource set, the configuration information further includes indication information indicating whether the second DCI format uses a plurality of SRS resource sets, and if the indication information indicates that the second DCI format uses the plurality of SRS resource sets, the terminal is indicated to determine, according to the at least one first SRS resource set, the at least one second SRS resource set configured for the second DCI format.

For example, in a case that the SRS resource sets configured for the different DCI formats may include only the at least one first SRS resource set configured for DCI format 0_1, the configuration information may further include indication information indicating whether DCI format 0_2 uses a plurality of SRS resource sets, and if the indication information indicates that DCI format 0_2 uses the plurality of SRS resource sets, the terminal is indicated to determine, according to the at least one first SRS resource set, the at least one second SRS resource set configured for DCI format 0_2.

(2) A first instruction associated with a first resource.

Optionally, the first resource includes but is not limited to at least one of the following: a control resource set (CORESET), search space, and a DCI format.

The first instruction may indicate the specific first resource associated with the first instruction, for example, an identifier of the associated CORESET, an identifier of the associated search space, or an identifier of the associated DCI format.

(3) Parameter information of the different DCI formats, where the parameter information includes at least one of the following: whether a target field exists, whether a second one field of the target field exists, and a size of the target field.

For example, the parameter information may be indicated by using higher layer information.

Optionally, the parameter information of the different DCI formats includes parameter information of a third DCI format and parameter information of a fourth DCI format.

For example, the parameter information of the different DCI formats may include parameter information of DCI format 0_1 and parameter information of DCI format 0_2. That is, one set of parameter information is separately configured for DCI format 0_1 and the DCI format 0_2.

Optionally, when the target field is a transmit power control (TPC) field, the parameter information of the different DCI formats includes parameter information of a fifth DCI format and parameter information of a sixth DCI format. For example, the parameter information of the different DCI formats may include parameter information of DCI format 1_1 and parameter information of DCI format 1_2, where DCI format 1_1 and DCI format 1_2 may be used to schedule a physical uplink control channel (PUCCH).

When the second one field of the target field does not exist, all repetition transmission occasions are transmitted by using one set of parameters indicated by one target field, or by using one set of parameters indicated by the target field and at least one set of default parameters.

(4) A configured grant (CG).

In a possible implementation, S210 may include: obtaining, by the terminal, the parameter information of the different DCI formats configured by higher layer signaling for the terminal, where the higher layer signaling includes radio resource control (RRC) signaling and/or a Medium Access Control (MAC) control element (CE).

S212: Determine, according to the configuration information and detected first target DCI, a transmission parameter of a target uplink channel scheduled by the first target DCI.

Optionally, the transmission parameter includes but is not limited to at least one of the following:

(1) spatial relationship information;

(2) a precoding matrix;

(3) port information; and (4) a power control parameter.

Optionally, the target field includes but is not limited to at least one of the following (1) to (6):

(1) a dynamic handover indicator field, where the dynamic handover indicator field is used to indicate which transmission parameters indicated by one or more target fields in at least one target field in the first target DCI are used for PUSCH transmission and/or a mapping order between a plurality of sets of transmission parameters indicated by a plurality of target fields and actual PUSCH transmission; or which parameters indicated by target fields associated with one or more SRS resource sets in a plurality of SRS resource sets used for codebook-based or non-codebook-based PUSCH transmission and/or a mapping order between a plurality of sets of transmission parameters indicated by the plurality of target fields and actual PUSCH transmission;

(2) an SRS resource indicator (SRI) field;

(3) a transmission precoding matrix indicator (TPMI) field or a precoding information and number of layers field, where the field is used to indicate precoding information and the number of layer for PUSCH transmission;

(4) a TPC field;

(5) a phase tracking reference signal (PTRS)-demodulation reference signal (DMRS) association field; and (6) an open-loop power control parameter set indicator.

In this embodiment of this application, the terminal may determine, based on the configuration information according to a format of the detected first target DCI, or a used resource, or whether a PUSCH is used to activate a configured grant, the transmission parameter of the target uplink channel scheduled by the first target DCI.

In this embodiment of this application, at least one of the SRS resource sets configured for the different DCI formats, the first instruction associated with the first resource, the parameter information of the different DCI formats, and the configured grant is indicated by the configuration information, and the transmission parameter of the uplink channel scheduled by the first target DCI may be jointly indicated by a DCI format of the first target DCI or the first resource, thereby reducing DCI overheads and improving scheduling reliability.

In this embodiment of this application, the terminal may receive network side configuration signaling, and determine a PUCCH or PUSCH transmission manner according to the network side configuration signaling and/or a received DCI format.

In an optional implementation, in a case that the configuration information includes the SRS resource sets configured for the different DCI formats, S212 may include: determining a target SRS resource configuration of the first target DCI according to the configuration information and a format of the detected first target DCI; and determining, according to a first quantity of SRS resource sets included in the target SRS resource configuration, to transmit the target uplink channel according to a transmission parameter indicated by a target field of a second quantity in the first target DCI, where the second quantity is less than or equal to the first quantity.

For example, a network side configures at least one SRS resource set for PUSCH codebook transmission or non-codebook transmission for the terminal.

For example, the SRS resource set is the at least one first SRS resource set and the at least one second SRS resource set separately configured for DCI format 0_1 and DCI format 0_2.

(1) When indexes of the first SRS resource set and the second SRS resource set are the same, an index set of an SRS resource configured in one SRS resource set is included in an index set of an SRS resource configured in the other SRS resource set.

Other parameters configured for the first SRS resource set and the second resource set are the same except the index of the included SRS resource, where the other parameters include but are not limited to a power control parameter and the like.

(2) An index set of the second SRS resource set includes or is included in an index set of the first SRS resource set.

The terminal may determine the target SRS resource configuration of the first target DCI according to the format of the detected first target DCI. For example, if the first target DCI is DCI format 0_1, the terminal determines that the target SRS resource configuration of the first target DCI is the at least one first SRS resource set; and then determine, according to the first quantity of the at least one first SRS resource set, to transmit the target uplink channel according to the transmission parameter indicated by the target field of the second quantity in the first target DCI, where the second quantity may be less than or equal to the first quantity.

For example, a network side device configures two SRS resource sets used for a codebook for DCI format 0_1: an SRS resource set 1 and an SRS resource set 2, and configures one SRS resource set used for a codebook for DCI format 0_2: the SRS resource set 1. If a format of DCI received by UE is DCI format 0_1, the DCI includes two SRI fields, and different scheduled PUSCH repetition transmission occasions may be associated with different SRS resources indicated by different SRI fields. If the format of the DCI received by the UE is DCI format 0_2, the DCI includes only one SRI field, and different scheduled PUSCH repetition transmission occasions are associated with one SRS resource indicated by the SRI field.

For another example, two SRS resource sets used for a codebook: an SRS resource set 1 and an SRS resource set 2, are configured for DCI format 0_1, and one SRS resource set used for a codebook: an SRS resource set 3, is configured for DCI format 0_2. If a format of DCI received by UE is DCI format 0_1, the DCI includes two SRI fields, and different scheduled PUSCH repetition transmission occasions may be associated with different SRS resources indicated by different SRI fields. If the format of the DCI received by the UE is DCI format 0_2, the DCI includes only one SRI field, and different scheduled PUSCH repetition transmission occasions can be only associated with one SRS resource indicated by the SRI field.

Alternatively, SRS resource sets configured for DCI format 0_1 and DCI format 0_2 may be alternatively the same. The UE may determine, according to another configuration, whether DCI format 0_2 uses the two SRS resource sets. If yes, a resource configuration corresponding to DCI format 0_2 is determined according to an SRS resource configuration of DCI format 0_1.

In another possible implementation, in a case that the configuration information includes first instruction associated with the first resource, S212 may include: in a case that the first target DCI is detected on the first resource associated with the first instruction, determining to transmit the target uplink channel by using a target transmission parameter, where the target transmission parameter includes at least one set of transmission parameters indicated by at least one target field in the first target DCI or at least one set of appointed transmission parameters.

Alternatively, S212 may include: in a case that the first target DCI is detected on a first resource that is not associated with the first instruction, determining to transmit the target uplink channel by using a target transmission parameter, where the target transmission parameter includes one set of transmission parameters indicated by one target field in the first target DCI or one set of appointed transmission parameters.

Optionally, the target transmission parameter includes one set of transmission parameters associated with a target SRS resource set, where the target SRS resource set is one of a plurality of SRS resource sets configured for the first target DCI.

Optionally, the target SRS resource set is an SRS resource set with a minimum identifier in the plurality of SRS resource sets configured for the first target DCI.

For example, the first instruction includes higher layer signaling. A target resource is associated with the first instruction. The target resource is a CORESET, search space, a DCI format, or the like. If the target resource is associated with the first instruction, all repetitions of a PUSCH scheduled by DCI detected by the UE on the target resource are allowed to be transmitted by using at least one set of parameters indicated by the at least one target field, or by using at least one set of default parameters.

The target parameter includes at least one of the following:

(1) spatial relationship information;
(2) port information; and
(3) a power control parameter.

The target field may be at least one of the following:

(1) an SRS resource indicator (SRI) field;
(2) a transmission precoding matrix indicator (TPMI) field;
(3) a TPC field;
(4) a phase tracking reference signal (PTRS)-demodulation reference signal (DMRS) association field; and
(5) an open-loop power control parameter set indicator.

If the target resource is not associated with the first instruction, all repetitions of a PUSCH scheduled by DCI detected by the UE on the target resource are transmitted by using one set of target parameters, or are transmitted by using one set of default parameters, or are transmitted by using one set of target parameters and at least one set of default parameters.

The target parameter is a set of parameters associated with a target SRS resource set. Further, the target SRS resource set is an SRS resource set with a small ID.

In a possible implementation, in a case that the configuration information includes the parameter information of the different DCI formats, S212 may include:

determining target parameter information of the first target DCI according to the parameter information of the different DCI formats and a format of the first target DCI; and determining, according to the target parameter information, the transmission parameter of the target uplink channel scheduled by the first target DCI.

Optionally, the determining, according to the target parameter information, the transmission parameter of the target uplink channel scheduled by the first target DCI may include:

in a case that the target parameter information indicates that the target field does not exist, determining to transmit the target uplink channel by using an appointed transmission parameter; and in a case that the target parameter information indicates that the second one field of the target field does not exist, determine to transmit the target uplink channel by using a transmission parameter indicated by a target field in the first target DCI, or determine to transmit the target uplink channel by using a transmission parameter indicated by a target field in the first target DCI and an appointed transmission parameter.

Optionally, in a case that the parameter information includes the size of the target field, the parameter information may further include a correspondence between each code point of the target field and indication information and/or an activated target code point.

For example, the indication information is used to indicate an SRS resource set an $n^{th}$ field of a target field, where n is an integer greater than 0, and is less than or equal to a quantity of fields included in the target field. The determining, according to the target parameter information, the transmission parameter of the target uplink channel scheduled by the first target DCI or the determining, according to the configuration information and detected first target downlink control information DCI, a transmission parameter of a target uplink channel scheduled by the first target DCI includes: obtaining target indication information corresponding to the activated target code point in the target parameter information according to the correspondence configured by the higher layer signaling in the target parameter information, and determining, according to the target indication information, the transmission parameter indicated by the target field in the first target DCI.

For example, whether the target field exists or whether the second one field of the target field exists or the bit size of the target field may be configured for the terminal by using the higher layer signaling.

The configuration may be separately configured for DCI format 0_1 and DCI format 0_2.

The target field may be at least one of the following:

(1) a dynamic handover indicator field, where the dynamic handover indicator field is used to indicate which transmission parameters indicated by one or more target fields in at least one target field in the first target DCI are used for PUSCH transmission and/or a mapping order between a plurality of sets of transmission parameters indicated by a plurality of target fields and actual PUSCH transmission; or which parameters indicated by target fields associated with one or more SRS resource sets in a plurality of SRS resource sets used for codebook-based or non-codebook-based PUSCH transmission and/or a mapping order between a plurality of sets of transmission parameters indicated by the plurality of target fields and actual PUSCH transmission;

(2) an SRI field;

(3) a TPMI field;

(4) a TPC field;

(5) a PTRS-DMRS association field; and (6) an open-loop power control parameter set indicator.

Optionally, when the target field is a TPC field, the configuration is separately configured for DCI format 1_1 and DCI format 1_2.

Optionally, if the second one field of the target field does not exist, all repetition transmission occasions are transmitted by using one set of parameters indicated by one target field, or by using one set of parameters indicated by the target field and at least one set of default parameters.

For example, the received first target DCI is DCI format 0_2. Table 1 provides transmission manners of PUSCH transmission scheduled by the first target DCI determined by the UE in several specific cases of each target field of the first target DCI.

TABLE 1

| Target field | PUSCH transmission |
|---|---|
| No dynamic handover indicator field; two SRI fields; two TPMI fields. | A PUSCH repetition scheduled by DCI format 0_2 is transmitted by using two spatial relationships and two power control sets indicated by the SRI field and two TPMIs indicated by the two TPMI fields |
| No dynamic handover indicator field; two SRI fields; one TPMI field. | A PUSCH repetition scheduled by DCI format 0_2 is transmitted by using two spatial relationships and two power control sets indicated by the SRI field, and all PUSCH repetitions are transmitted by using one TPMI indicated by one TPMI field |
| Size of the dynamic handover indicator field is 1 bit; one SRI field; two TPMI fields. | A PUSCH repetition scheduled by DCI format 0_2 is transmitted by using one spatial relationship and one power control set indicated by the SRI field. The dynamic handover indicator field is used to indicate whether a PUSCH repetition uses an SRI and/or a TPMI indicated by one TPMI field or SRIs and/or TPMIs indicated by two TPMI fields |

TABLE 1-continued

| Target field | PUSCH transmission |
|---|---|
| Size of the dynamic handover indicator field is 1 bit; two SRI fields; two TPMI fields. | A dynamic handover indicator field of DCI format 0_2 is used to indicate whether a PUSCH repetition uses an SRI and/or a TPMI indicated by one SRI field and/or TPMI field or SRIs and/or TPMIs indicated by two SRI fields and/or TPMI fields |
| Size of the dynamic handover indicator field is 2 bits; two SRI fields; two TPMI fields. | A dynamic handover indicator field of DCI format 0_2 is used to indicate whether a PUSCH repetition uses one SRI field and/or TPMI field or two SRI fields/TPMI fields. When it is indicated that one SRI field and/or TPMI field is used, the field further indicates an SRI and/or a TPMI indicated by which SRI field/TPMI field. When it is indicated that two SRI fields/TPMI fields are used for transmission, the field further indicates an association order between two SRIs and/or TPMIs and PUSCH transmission, that is, which SRI and/or TPMI is used for a first PUSCH repetition. |

Optionally, the bit size of the target field may be further configured by higher layer signaling, and an indication of the target field is notified by a Medium Access Control (MAC) control element (CE).

For example, a size of the dynamic handover indicator field and all code points are configured by radio resource control (RRC) or predefined. The MAC CE chooses to activate a part of code points, where the MAC CE may determine a quantity of activated code points according to the size of the dynamic handover indicator field. For example, if a bit size of the dynamic handover indicator field is X, the MAC CE may simultaneously activate $2^X$ mapping relationships.

For example, a code point that is of the dynamic handover indicator field and that is configured by RRC or a predefined code point of the dynamic handover indicator field may be shown in Table 2.

TABLE 2

| Value (value) | Indication information (indication) |
|---|---|
| 0 | First SRS resource set or first SRI field |
| 1 | Second SRS resource set or second SRI field |
| 2 | First SRS resource set or first SRI field, and second SRS resource set or second SRI field |
| 3 | Second SRS resource set or second SRI field, and first SRS resource set or first SRI field |

If the MAC CE activates two of the code points such as 0 and 1, the size of the dynamic handover indicator field in the first target DCI is 1 bit, and indication information corresponding to each value is shown in Table 3.

TABLE 3

| Value (value) | Indication information (indication) |
|---|---|
| 0 | First SRS resource set or first SRI field |
| 1 | Second SRS resource set or second SRI field |

In still another possible implementation, in S212, the UE may further determine the transmission parameter of the target uplink channel according to whether the format of the first target DCI is a predetermined DCI format and whether the target uplink channel scheduled by the first target DCI is a PUSCH corresponding to the configured grant. In this possible implementation, S212 may include: in a case that a format of the first target DCI is a predetermined DCI format and the target uplink channel scheduled by the first target DCI is a configured grant PUSCH (that is, the first target DCI is used to activate the configured grant PUSCH), determining the transmission parameter of the target uplink channel according to a target resource and a repetition parameter in the configured grant.

Optionally, the predetermined DCI format includes DCI format 0_0.

In a possible implementation, the determining the transmission parameter of the target uplink channel according to a target resource and a repetition parameter in the configured grant includes:

in a case that a value of the repetition parameter is 1, determining one target spatial relationship and/or one target path loss reference signal of the target uplink channel according to target information configured for or associated with the target resource, where the target information includes at least one of the following: spatial information, a path loss reference signal, and a reference signal. In other words, in a case that the repetition parameter indicates not to perform repeated transmission, one target spatial relationship and/or one target path loss reference signal of the target uplink channel are/is determined according to the target information configured for or associated with the target resource.

Optionally, the determining the transmission parameter of the target uplink channel according to a target resource and a repetition parameter in the configured grant includes: in a case that the value of the repetition parameter is greater than 1, determining a plurality of target spatial relationships and/or a plurality of target path loss reference signals of the target uplink channel according to the target information configured for or associated with the target resource. In other words, in a case that the repetition parameter indicates to perform repeated transmission, the plurality of target spatial relationships and/or the plurality of target path loss reference signals of the target uplink channel are determined according to the target information configured for or associated with the target resource.

In the foregoing possible implementation, optionally, the target resource may include:

a PUCCH resource with a minimum identifier configured for the terminal; or a CORESET with a minimum identifier configured for the terminal.

In the foregoing possible implementation, optionally, the one target spatial relationship is a spatial relationship with a minimum index value in at least one spatial relationship of the target resource, or the one target spatial relationship is determined based on a target reference signal, where the target reference signal is a reference signal corresponding to a target transmission configuration indicator (TCI) state associated with the target resource.

Optionally, the one target path loss reference signal is an associated path loss reference signal in the spatial relationship with the minimum index value in the at least one spatial relationship of the target resource; or the one target path loss reference signal is determined based on the target reference signal.

The target TCI state is a TCI state with a minimum index value in a TCI state associated with the target resource.

The target reference signal is a reference signal corresponding to a quasi co-location (QCL) of a type D associated with the target TCI state.

For example, the target reference signal may be a reference signal corresponding to a QCL of a Type-D associated with a TCI state with a minimum index value in at least one TCI state associated with the target resource.

Optionally, the determining the transmission parameter of the target uplink channel according to a target resource and a repetition parameter in the configured grant may further include:

in a case that the value of the repetition parameter is 1, determining that a power control parameter of the target uplink channel is a first set of power control parameters configured in the configured grant or one set of power control parameters with a minimum index value configured in the configured grant, or determining that a power control parameter of the target uplink channel is associated with one set of power control parameters of an SRS resource set with a minimum index value in SRS resource sets configured in the first target DCI.

For example, if the UE receives DCI, where the DCI is DCI format 0_0, and the DCI is used to activate the PUSCH corresponding to the configured grant, spatial relationship information of the PUSCH is determined as follows:

(1) If repetition=1, one spatial relationship is determined according to spatial information configured for or associated with the target resource or a reference signal. The target resource is a PUCCH resource corresponding to a minimum ID, and the target spatial relationship is a spatial relationship with a small index value in at least one spatial relationship of the target resource, or the target resource is a CORESET corresponding to a minimum ID, and the target spatial relationship is a reference signal of a QCL-type D associated with a TCI state with a small index in at least one TCI state of the target resource.

In addition, the UE may determine that a power control parameter of the PUS CH uses a first set configured by the CG or a set with a small index value configured by the CG.

(2) If repetition >1, a plurality of spatial relationships are determined according to spatial information configured for or associated with the target resource or a reference signal. The target resource is a PUCCH resource corresponding to a minimum ID, or the target resource is a CORESET corresponding to a minimum ID.

According to the foregoing method provided in this embodiment of this application, single-TRP transmission and multi-TRP transmission may be separately scheduled by DCI in different DCI formats, so that DCI overheads in a single-TRP scenario can be effectively reduced, and scheduling reliability is improved.

When DCI is used to schedules a PUSCH, a bandwidth part (BWP) indicator field may indicate a BWP that is different from a currently activated BWP, to implement uplink BWP switching. When a BWP of a multi-TRP configuration is switched to a BWP of a single-TRP configuration or a BWP of a single-TRP configuration is switched to a BWP of a multi-TRP configuration, a quantity of target fields required for interpreting the target BWP may be different from a quantity of target fields included in the received DCI. Therefore, the terminal may not know how to interpret each field of the DCI, and therefore the terminal and the network have different understanding on scheduling, resulting in a scheduling failure, and affecting reliability and delay of data transmission. For this problem, an embodiment of this application provides a DCI parsing method.

Figure 3:
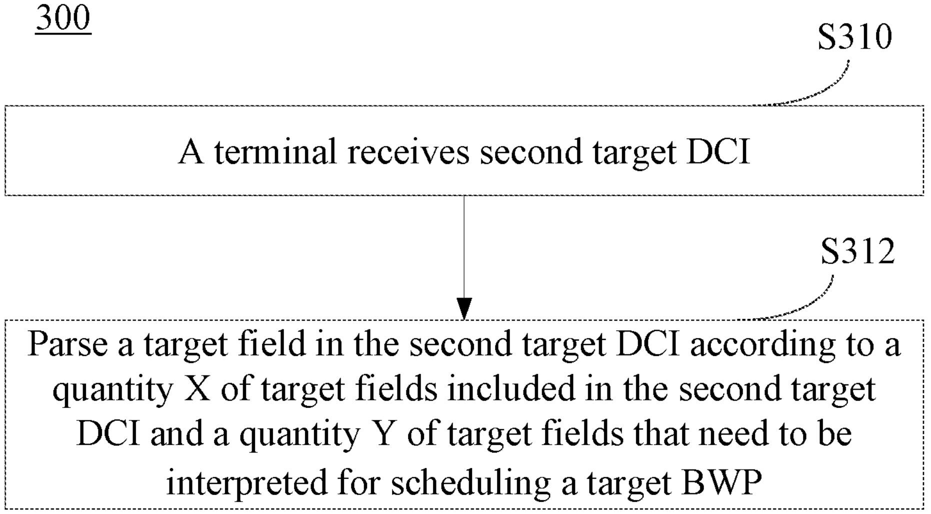
FIG. 3 is a flowchart of a DCI parsing method according to an embodiment of this application.

FIG. 3 is a schematic flowchart of a DCI parsing method according to an embodiment of this application. The method 300 may be performed by a terminal. In other words, the method may be performed by software or hardware installed in the terminal. As shown in FIG. 3, the method may include the following steps:

S310: A terminal receives second target DCI, where a target BWP indicated by a BWP indicator field in the second target DCI is not an activated BWP.

S312: Parse a target field in the second target DCI according to a quantity X of target fields included in the second target DCI and a quantity Y of target fields that need to be interpreted for scheduling the target BWP, where X and Y are integers greater than or equal to 0.

In a possible implementation, the parsing a target field in the second target DCI according to a quantity X of target fields included in the second target DCI and a quantity Y of target fields that need to be interpreted for scheduling the target BWP includes: in a case that X is greater than or equal to Y, parsing the first or last Y target fields in the second target DCI. In this possible implementation, when the quantity X of target fields included in the second target DCI is greater than or equal to the quantity Y of target fields that need to be interpreted for scheduling the target BWP, only the first or last Y target fields in the second target DCI are parsed. For example, when a BWP of a multi-TRP configuration is switched to a BWP of a single-TRP configuration, if a quantity of target fields included in the second target DCI is N (N>1), and a quantity of target fields that need to be interpreted for scheduling the target BWP is 1, only a first target field included in the second target DCI is parsed.

In the foregoing possible implementation, optionally, in a case that Y is 0, the target field in the second target DCI is not parsed.

In a possible implementation, the parsing a target field in the second target DCI according to a quantity X of target fields included in the second target DCI and a quantity Y of target fields that need to be interpreted for scheduling the target BWP includes: in a case that X is less than Y, assuming, by the terminal, that the second target DCI includes Y target fields, where the Y target fields include Y-X target fields and X target fields in the second target DCI in order, or include the X target fields and the Y-X target fields in order, where values of the Y-X target fields are 0; and parsing the Y target fields. In other words, in this possible implementation, if X is less than Y, the Y-X target fields whose values are 0 are filled before the X target fields, or the Y-X target fields whose values are 0 are filled after the X target fields, and a quantity of filled bits is the same as a quantity of bits included in the Y-X target fields.

In the foregoing possible implementation, in a case that X is 0, the terminal assumes that there is no corresponding target field on the target BWP. That is, when X is 0, the terminal considers that there is no corresponding target field on the target BWP.

Alternatively, in another possible implementation, the parsing a target field in the second target DCI according to a quantity X of target fields included in the second target DCI and a quantity Y of target fields that need to be interpreted for scheduling the target BWP includes: in a case that X is less than Y, assuming, by the terminal, that only X valid SRS resource sets on the target BWP are associated with X target fields in the second target DCI; and parsing the X target fields in the second target DCI according to the X valid SRS resource sets.

In the foregoing possible implementation, the X valid SRS resource sets include one of the following: the first or last X valid SRS resource sets that are in a plurality of SRS resource sets configured on the target BWP and that are sorted according to a target order, where the target order includes one of the following:

a configuration order;

a descending order of index values;

an ascending order of index values; and an order associated with Y target fields.

In still another possible implementation, the parsing a target field in the second target DCI according to a quantity X of target fields included in the second target DCI and a quantity Y of target fields that need to be interpreted for scheduling the target BWP includes: in a case that X is not equal to Y, parsing, by the terminal, one target field in the second target DCI, where the one target field includes one of the following: a first target field in the second target DCI; and a target field corresponding to a target SRS resource set in the second target DCI, where the target SRS resource set is one of a plurality of SRS resource sets configured on the target BWP or activated BWP.

In the foregoing possible implementation, the target SRS resource set is one SRS resource set with a minimum index value in the plurality of SRS resource sets configured on the target BWP or activated BWP.

In a possible implementation, before the parsing, by the terminal, a target field in the second target DCI, the method further includes:

in a case that a first quantity of bits occupied by the target field in the second target DCI is less than a second quantity of bits occupied by the target field (that is, a target field in DCI on the target BWP) that needs to be interpreted for scheduling the target BWP, filling zero before a bit string of the target field in the second target DCI until a length of the bit string is the second quantity of bits; and/or in a case that the first quantity of bits is greater than or equal to the second quantity of bits, deleting a part of the bits starting from a least significant bit of the bit string of the target field in the second target DCI, so that the length of the bit string is the second quantity of bits.

For example, a quantity of bits occupied by the target field in the second target DCI is X, and a quantity of bits occupied by the target field of the DCI on the target BWP is y. If $x<y$, $(y-x)$ zeros are filled before the X bits of the target field in the second target DCI; or if $x<=y$, $(x-y)$ bits are deleted from the X bits of the target field in the second target DCI starting from a least significant bit.

In the foregoing possible implementations, optionally, the target field includes but is not limited to at least one of the following:

a dynamic handover indicator field;

an SRS field;

a TPMI field;

a TPC field;

a PTRS-DMRS association field; and an open-loop power control parameter set indicator.

In the foregoing possible implementations, optionally, an SRI field in the second target DCI correspondingly indicates an SRS resource in an SRS resource set configured on the activated BWP.

For example, if UE receives DCI, where the DCI includes a BWP indicator field, and a BWP (that is, a target BWP) indicated by the BWP indicator field is not a currently activated BWP (a current BWP), a method for interpreting the DCI is as follows:

For an information field I, the DCI includes X information fields I, and Y information fields I need to be interpreted for scheduling on the target BWP.

If X>Y:

(1.1) The UE interprets only the first or last Y information fields I of the current DCI.

(1.2) If Y=0, the UE does not interpret the information field I of the current DCI.

If X<Y:

(2.1) The UE assumes that there are Y information fields I in the current DCI, where zero needs to be filled in the first Y-X information fields, or zero needs to be filled in the last Y-X information fields. A quantity of bits of the filled zero is the same as a quantity of bits of the corresponding information field I required by the target BWP.

In particular, if X=0, the UE assumes that the target BWP does not have an information field I.

(2.2) The UE assumes that the first/last Y-X target fields of the DCI on the target BWP are invalid.

The UE assumes that only X valid SRS resource sets are associated with X information fields of the DCI on the target BWP.

The first/last X SRS resource sets are taken according to a configuration order of the SRS resource sets; or the first/last X SRS resource sets are taken by sorting the SRS resource sets according to index values; or the first/last X SRS resource sets are taken by sorting the SRS resource sets according to an association order with the Y information fields I in the DCI on the target BWP.

(3) If X is not equal to Y, the UE assumes that only one information field I is valid.

(3.1) The information field I is a first information field I.

(3.2) The UE assumes that there is only one SRS resource set for PUSCH transmission on the current BWP or the target BWP. Optionally, SRS resource set is an SRS resource set with a small index value.

In the foregoing case, if a size of an information field I of the current DCI is less than a size of an information field I corresponding to the DCI on the target BWP, zero is filled before the current information field I, and if the size of the information field I of the current DCI is greater than the size of the information field I corresponding to the DCI on the target BWP, bits are deleted starting from a least significant bit of the current information field I, so that the size of the information field I of the current DCI is equal to that of the information field I corresponding to the DCI on the target BWP.

The information field I is at least one of the following:

an SRI field;

a TPMI field;

a TPC field;

a PTRS-DMRS association field; and an open-loop power control parameter set indicator field.

The SRI field of the received DCI correspondingly indicates an SRS resource set configured on the current BWP.

For example, the current DCI includes two SRI fields, and two SRS resource sets used for codebook or non-codebook transmission are configured for the BWP indicated by the BWP indicator field of the current DCI. In this case, two SRI fields are required, and the UE considers that the two SRI fields of the current DCI are associated one by one with the two SRS resource sets configured on the target BWP.

For another example, the current DCI includes two SRI fields, and two SRS resource sets used for codebook or non-codebook transmission are configured for the BWP indicated by the BWP indicator field of the current DCI, where only one SRS resource is configured in one SRS resource set. In this case, two SRI fields are required, and a bit size of one field is 0. The UE considers that a first SRI field of the current DCI corresponds to the SRI field required by the target BWP, and a bit size of a second SRI field is 0.

For another example, the current DCI includes two SRI fields, and one SRS resource set used for codebook or non-codebook transmission is configured for the BWP indicated by the BWP indicator field of the current DCI. In this case, one SRI field is required, and the UE considers that a first SRI field of the current DCI corresponds to the SRI field required by the target BWP.

For another example, the current DCI includes two SRI fields, and one SRS resource set used for codebook or non-codebook transmission is configured for the BWP indicated by the BWP indicator field of the current DCI. In this case, one SRI field is required, and the UE expects the current DCI to indicate, through the dynamic indicator field, which of the two SRI fields corresponds to the SRI field required by the target BWP.

For another example, the current DCI includes one SRI field, and two SRS resource sets used for codebook or non-codebook transmission are configured for the BWP indicated by the BWP indicator field of the current DCI. In this case, two SRI fields are required, and the UE considers that the SRI field of the current DCI corresponds to a first SRI field required by the target BWP, that is, the SRI field of the current DCI is correspondingly associated with a 1st SRS resource set configured on the target BWP or an SRS resource set with a small ID. The UE ignores a second SRI field required by the target BWP.

For another example, the current DCI includes one SRI field, and two SRS resource sets used for codebook or non-codebook transmission are configured for the BWP indicated by the BWP indicator field of the current DCI. In this case, two SRI fields are required, and the UE assumes that there are two SRI fields of the current DCI, where a first SRI field corresponds to a first SRI field required by the target BWP, and a second SRI field is 0 and corresponds to a 2nd SRS resource set on the target BWP.

For another example, the current DCI includes two SRI fields and one TPMI field, and two SRS resource sets used for a codebook are configured for the BWP indicated by the BWP indicator field of the current DCI. In this case, two SRI fields are required, a second TPMI field is configured for the target BWP, and the target BWP needs two TPMI fields. Therefore, the UE assumes that the current DCI includes two TPMI fields, where a first field is a current field and corresponds to a first field required by the target BWP, and a second one field is 0 by default and corresponds to the second TPMI field required by the target BWP.

For another example, the current DCI includes two SRI fields, two TPMI fields, and two SRS resource sets used for codebook transmission are configured for the BWP indicated by the BWP indicator field of the current DCI. In this case, two SRI fields are required, no second TPMI field is configured for the target BWP, and the target BWP needs one TPMI field. Therefore, the UE considers that a first TPMI field of the current DCI corresponds to the TPMI field required by the target BWP.

For another example, the current DCI includes two SRI fields and one TPC field, and two SRS resource sets used for codebook transmission are configured for the target BWP. If a second TPC field exists, the terminal assumes that the target BWP includes only one TPC field, and the second TPC field does not exist.

The foregoing technical solution provided in this embodiment of this application provides a solution in which the terminal parses an indication parameter corresponding to each field of DCI during BWP switching, to resolve a problem that the terminal and the network side device may have different understanding on scheduling, thereby improving scheduling reliability and reliability of data transmission.

Figure 4:
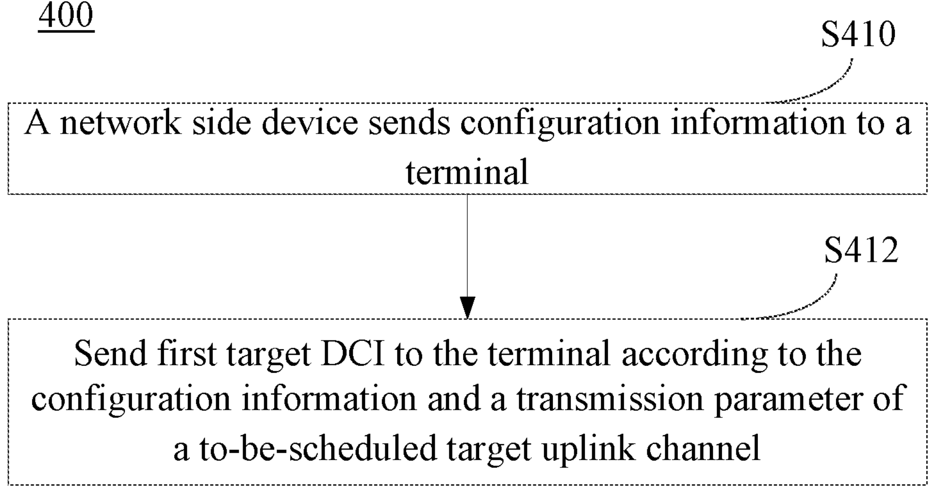
FIG. 4 is a flowchart of a scheduling method according to an embodiment of this application.

FIG. 4 is a schematic flowchart of a scheduling method according to an embodiment of this application. The method 400 may be performed by a network side device. In other words, the method may be performed by software or hardware installed in the network side device. As shown in FIG. 4, the method may include the following steps:

S410: A network side device sends configuration information to a terminal.

This step corresponds to S210 in the method 200.

The configuration information is used to indicate any one of the following:

SRS resource sets configured for different DCI formats, where the SRS resource set is used for codebook-based transmission or non-codebook-based transmission;

a first instruction associated with a first resource, where the first resource includes at least one of the following: a control resource set, search space, and a DCI format;

parameter information of the different DCI formats, where the parameter information includes at least one of the following: whether a target field exists, whether a second one field of the target field exists, and a size of the target field; and a configured grant.

The configuration information is the same as the configuration information in the method 200. For details, refer to the descriptions in the method 200. Details are not described herein again.

S412: Send first target DCI to the terminal according to the configuration information and a transmission parameter of a to-be-scheduled target uplink channel, where the first target DCI is used to schedule the target uplink channel.

This step is behavior of the network side device corresponding to S212 in the method 200. The first target DCI is the same as the first target DCI in the method 200. For details, refer to the descriptions in the method 200.

According to the technical solution provided in this embodiment of this application, the network side device may configure the configuration information for the terminal, so that scheduling in different DCI formats works in a single-TRP scenario and a multi-TRP scenario, thereby effectively reducing DCI overheads in the single-TRP scenario and improving scheduling reliability.

The method 400 is corresponding behavior of the network side device in the method 200. In this embodiment, only a part of possible implementations in the method 400 are described. For other implementations, refer to the descriptions in the method 200.

In a possible implementation, the SRS resource sets configured for the different DCI formats include at least one first SRS resource set configured for a first DCI format and/or at least one second SRS resource set configured for a second DCI format, for example, at least one first SRS resource set configured for DCI format 0_1 and/or at least one second SRS resource set configured for DCI format 0_2.

In the foregoing possible implementation, optionally, the sending first target DCI to the terminal according to the configuration information and a transmission parameter of a scheduled target uplink channel includes:

determining a target SRS resource configuration of the first target DCI according to the configuration information and a format of the first target DCI;

determining, according to a first quantity of SRS resource sets included in the target SRS resource configuration, a second quantity of target fields that are in the first target DCI and that indicate the transmission parameter of the target uplink channel, where the second quantity is less than or equal to the first quantity; and sending the first target DCI.

In the foregoing possible implementation, the sending first target DCI to the terminal according to the configuration information and a transmission parameter of a scheduled target uplink channel includes:

in a case that the transmission parameter of the target uplink channel includes at least one set of transmission parameters, sending the first target DCI on the first resource associated with the first instruction; and in a case that the transmission parameter of the target uplink channel includes one set of transmission parameters, sending the first target DCI on a first resource that is not associated with the first instruction.

In a possible implementation, the parameter information of the different DCI formats includes parameter information of a third DCI format and parameter information of a fourth DCI format, for example, parameter information of DCI format 0_1 and parameter information of DCI format 0_2.

In a possible implementation, in a case that the target field includes a TPC field, the parameter information of the different DCI formats includes parameter information of a fifth DCI format and parameter information of a sixth DCI format, for example, parameter information of DCI format 1_1 and parameter information of DCI format 1_2.

In a possible implementation, the sending first target DCI to the terminal according to the configuration information and a transmission parameter of a scheduled target uplink channel includes:

determining a target format of the first target DCI according to the transmission parameter of the target uplink channel and the parameter information of the different DCI formats; and sending the first target DCI in the target format.

In the foregoing possible implementation, in a case that target parameter information corresponding to the target format indicates that the target field does not exist, the target uplink channel is indicated to be transmitted by using an appointed transmission parameter; and in a case that the target parameter information indicates that the second one field of the target field does not exist, the target field in the first target DCI indicates all transmission parameters of the target uplink channel, or the target field in the first target DCI indicates a part of transmission parameters of the target uplink channel.

In the foregoing possible implementation, in a case that the parameter information includes the size of the target field, the parameter information may further include a correspondence between each code point of the target field and indication information and/or an activated target code point.

Optionally, the indication information may be used to indicate an SRS resource set an $n^{th}$ field of a target field, where n is an integer greater than 0, and is less than or equal to a quantity of fields included in the target field; and the sending the first target DCI in the target format may include:

determining an indication value of a target field in the first target DCI according to the target code point in the target parameter information corresponding to the target format and target indication information corresponding to the target code point; and sending the first target DCI carrying the indication value.

In the foregoing possible implementation, the sending first target DCI to the terminal according to the configuration information and a transmission parameter of a scheduled target uplink channel includes:

in a case that the target uplink channel is a PUSCH corresponding to the configured grant, sending the first target DCI in a predetermined DCI format to the terminal, where the predetermined DCI format includes DCI format 0_0.

It should be noted that the method for determining a transmission parameter of an uplink channel provided in the embodiments of this application may be performed by an apparatus for determining a transmission parameter of an uplink channel, or a control module that is in the apparatus for determining a transmission parameter of an uplink channel and that is configured to perform the method for determining a transmission parameter of an uplink channel. In the embodiments of this application, an example in which the apparatus for determining a transmission parameter of an uplink channel performs the method for determining a transmission parameter of an uplink channel is used to describe the apparatus for determining a transmission parameter of an uplink channel provided in the embodiments of this application.

Figure 5:
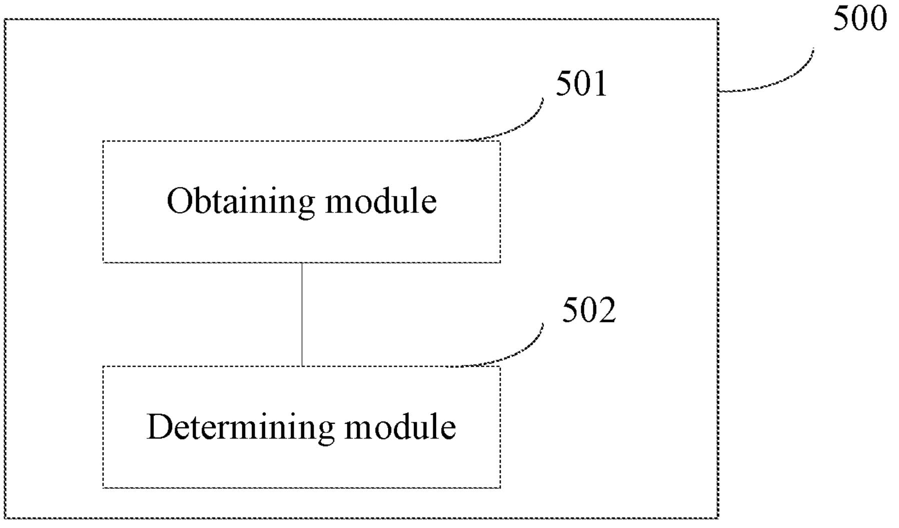
FIG. 5 is a schematic structural diagram of an apparatus for determining a transmission parameter of an uplink channel according to an embodiment of this application.

FIG. 5 is a schematic structural diagram of an apparatus for determining a transmission parameter of an uplink channel according to an embodiment of this application. As shown in FIG. 5, the apparatus mainly includes an obtaining module 501 and a determining module 502.

In this embodiment of this application, the obtaining module 501 is configured to obtain configuration information; and the determining module 502 is configured to determine, according to the configuration information and detected first target downlink control information DCI, a transmission parameter of a target uplink channel scheduled by the first target DCI, where the configuration information is used to indicate any one of the following: SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

In a possible implementation, the SRS resource sets configured for the different DCI formats include at least one first SRS resource set configured for a first DCI format and/or at least one second SRS resource set configured for a second DCI format, for example, at least one first SRS resource set configured for DCI format 0_1 and/or at least one second SRS resource set configured for DCI format 0_2.

In a possible implementation, in a case that an index of the first SRS resource set is the same as an index of the second SRS resource set, the first index set is included in the second index set.

The first index set is an index set of an SRS resource configured in the first SRS resource set, and the second index set is an index set of an SRS resource configured in the second SRS resource set.

In a possible implementation, in a case that an index of the first SRS resource set is the same as an index of the second SRS resource set, the first parameter of the first SRS resource set is the same as the first parameter of the second SRS resource set, where the first parameter is a parameter other than an index of an SRS resource in a configuration parameter of an SRS resource set.

In a possible implementation, an index set of the at least one second SRS resource set is included in an index set of the at least one first SRS resource set.

In a possible implementation, in a case that the SRS resource sets configured for the different DCI formats include only the first SRS resource set, the configuration information further includes indication information indicating whether the second DCI format uses a plurality of SRS resource sets, and if the indication information indicates that the second DCI format uses the plurality of SRS resource sets, the terminal is indicated to determine, according to the at least one first SRS resource set, the at least one second SRS resource set configured for the second DCI format.

In a possible implementation, that the determining module 502 determines, according to the configuration information and detected first target downlink control information DCI, a transmission parameter of a target uplink channel scheduled by the first target DCI includes:

determining a target SRS resource configuration of the first target DCI according to the configuration information and a format of the detected first target DCI; and determining, according to a first quantity of SRS resource sets included in the target SRS resource configuration, to transmit the target uplink channel according to a transmission parameter indicated by a target field of a second quantity in the first target DCI, where the second quantity is less than or equal to the first quantity.

In a possible implementation, that the determining module 502 determines, according to the configuration information and detected first target downlink control information DCI, a transmission parameter of a target uplink channel scheduled by the first target DCI includes:

in a case that the first target DCI is detected on the first resource associated with the first instruction, determining to transmit the target uplink channel by using a target transmission parameter, where the target transmission parameter includes at least one set of transmission parameters indicated by at least one target field in the first target DCI or at least one set of appointed transmission parameters.

In a possible implementation, that the determining module 502 determines, according to the configuration information and detected first target downlink control information DCI, a transmission parameter of a target uplink channel scheduled by the first target DCI includes:

in a case that the first target DCI is detected on a first resource that is not associated with the first instruction, determining to transmit the target uplink channel by using a target transmission parameter, where the target transmission parameter includes one set of transmission parameters indicated by one target field in the first target DCI or one set of appointed transmission parameters.

In a possible implementation, the target transmission parameter includes one set of transmission parameters associated with a target SRS resource set, where the target SRS resource set is one of a plurality of SRS resource sets configured for the first target DCI.

In a possible implementation, the target SRS resource set is an SRS resource set with a minimum identifier in the plurality of SRS resource sets configured for the first target DCI.

In a possible implementation, the parameter information of the different DCI formats includes parameter information of a third DCI format and parameter information of a fourth DCI format, for example, parameter information of DCI format 0_1 and parameter information of DCI format 0_2.

In a possible implementation, in a case that the target field includes a transmit power control TPC field, the parameter information of the different DCI formats includes parameter information of a fifth DCI format and parameter information of a sixth DCI format, for example, parameter information of DCI format 1_1 and parameter information of DCI format 1_2.

In a possible implementation, that the determining module 502 determines, according to the configuration information and detected first target downlink control information DCI, a transmission parameter of a target uplink channel scheduled by the first target DCI includes:

determining target parameter information of the first target DCI according to the parameter information of the different DCI formats and a format of the first target DCI; and determining, according to the target parameter information, the transmission parameter of the target uplink channel scheduled by the first target DCI.

In a possible implementation, that the determining module 502 determines, according to the target parameter information, the transmission parameter of the target uplink channel scheduled by the first target DCI includes:

in a case that the target parameter information indicates that the target field does not exist, determining to transmit the target uplink channel by using an appointed transmission parameter; and in a case that the target parameter information indicates that the second one field of the target field does not exist, determine to transmit the target uplink channel by using a transmission parameter indicated by a target field in the first target DCI, or determine to transmit the target uplink channel by using a transmission parameter indicated by a target field in the first target DCI and an appointed transmission parameter.

In a possible implementation, in a case that the parameter information includes the size of the target field, the parameter information may further include a correspondence between each code point of the target field and indication information and/or an activated target code point.

In a possible implementation, that the determining module 502 determines, according to the configuration information and detected first target downlink control information DCI, a transmission parameter of a target uplink channel scheduled by the first target DCI includes:

in a case that a format of the first target DCI is a predetermined DCI format and the target uplink channel scheduled by the first target DCI is a PUSCH corresponding to the configured grant, determining the transmission parameter of the target uplink channel according to a target resource and a repetition parameter in the configured grant.

In a possible implementation, the predetermined DCI format includes DCI format 0_0

In a possible implementation, that the determining module 502 determines the transmission parameter of the target uplink channel according to a target resource and a repetition parameter in the configured grant includes:

in a case that a value of the repetition parameter is 1, determining one target spatial relationship and/or one target path loss reference signal of the target uplink channel according to target information configured for or associated with the target resource, where the target information includes at least one of the following: spatial information, a path loss reference signal, and a reference signal; and/or in a case that the value of the repetition parameter is greater than 1, determining a plurality of target spatial relationships and/or a plurality of target path loss reference signals of the target uplink channel according to the target information configured for or associated with the target resource.

In a possible implementation, the target resource includes:

a PUCCH resource with a minimum identifier configured for the terminal; or a CORESET with a minimum identifier configured for the terminal.

In a possible implementation, the one target spatial relationship is a spatial relationship with a minimum index value in at least one spatial relationship of the target resource, or the one target spatial relationship is determined based on a target reference signal, where the target reference signal is a reference signal corresponding to a target transmission configuration indicator TCI state associated with the target resource; and the one target path loss reference signal is an associated path loss reference signal in the spatial relationship with the minimum index value in the at least one spatial relationship of the target resource; or the one target path loss reference signal is determined based on the target reference signal.

In a possible implementation, the target TCI state is a TCI state with a minimum index value in a TCI state associated with the target resource.

In a possible implementation, the target reference signal is a reference signal corresponding to a quasi co-location QCL of a type D associated with the target TCI state.

In a possible implementation, that the determining module 502 determines the transmission parameter of the target uplink channel according to a target resource and a repetition parameter in the configured grant further includes:

in a case that the value of the repetition parameter is 1, determining that a power control parameter of the target uplink channel is a first set of power control parameters configured in the configured grant or one set of power control parameters with a minimum index value configured in the configured grant, or determining that a power control parameter of the target uplink channel is associated with one set of power control parameters of an SRS resource set with a minimum index value in SRS resource sets configured in the configured grant.

In a possible implementation, that the obtaining module 501 obtains configuration information includes: obtaining the parameter information of the different DCI formats configured by higher layer signaling for the terminal.

In a possible implementation, the higher layer signaling includes RRC signaling and/or a MAC CE.

In a possible implementation, the transmission parameter includes at least one of the following:

spatial relationship information;

a precoding matrix;

port information; and a power control parameter.

In a possible implementation, the target field includes at least one of the following:

a dynamic handover indicator field;

an SRI field;

a TPMI field;

a TPC field;

a PTRS-DMRS association field; and an open-loop power control parameter set indicator.

The apparatus for determining a transmission parameter of an uplink channel in this embodiment of this application may be an apparatus, or may be a component, an integrated circuit, or a chip in a terminal. The apparatus may be a mobile terminal, or a non-mobile terminal. For example, the mobile terminal may include but is not limited to the types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The apparatus for determining a transmission parameter of an uplink channel in this embodiment of this application may be an apparatus with an operating system. The operating system may be an Android operating system, an iOS operating system, or another possible operating system. This is not specifically limited in this embodiment of this application.

The apparatus for determining a transmission parameter of an uplink channel provided in this embodiment of this application can implement the processes implemented by the terminal in the method embodiments in FIG. 2 to FIG. 4, and achieve a same technical effect. To avoid repetition, details are not described herein again.

Figure 6:
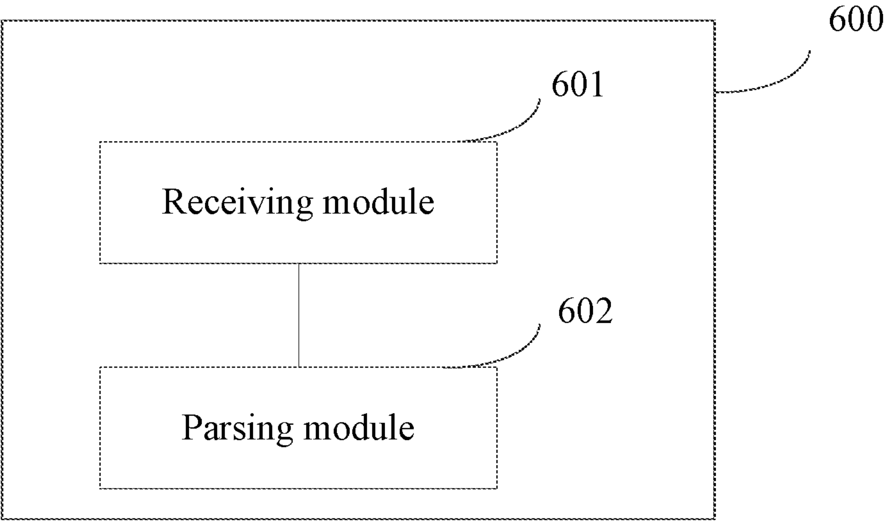
FIG. 6 is a schematic structural diagram of a DCI parsing apparatus according to an embodiment of this application.

FIG. 6 is a schematic structural diagram of a DCI parsing apparatus according to an embodiment of this application. As shown in FIG. 6, the apparatus 600 mainly includes a receiving module 601 and a parsing module 602.

In this embodiment of this application, the receiving module 601 is configured to receive second target DCI, where a target BWP indicated by a BWP indicator field in the second target DCI is not an activated BWP; and the parsing module 602 is configured to parse a target field in the second target DCI according to a quantity X of target fields included in the second target DCI and a quantity Y of target fields that need to be interpreted for scheduling the target BWP, where X and Y are integers greater than or equal to 0.

In a possible implementation, that the parsing module 602 parses a target field in the second target DCI according to a quantity X of target fields included in the second target DCI and a quantity Y of target fields that need to be interpreted for scheduling the target BWP includes:

in a case that X is greater than or equal to Y, parsing the first or last Y target fields in the second target DCI.

In a possible implementation, that the parsing module 602 parses the first or last Y target fields in the second target DCI includes:

in a case that Y is 0, not parsing the target field in the second target DCI.

In a possible implementation, that the parsing module 602 parses a target field in the second target DCI according to a quantity X of target fields included in the second target DCI and a quantity Y of target fields that need to be interpreted for scheduling the target BWP includes:

in a case that X is less than Y, assuming, by the terminal, that the second target DCI includes Y target fields, where the Y target fields include Y-X target fields and X target fields in the second target DCI in order, or include the X target fields and the Y-X target fields in order, where values of the Y-X target fields are 0; and parsing the Y target fields.

In a possible implementation, that the parsing module 602 parses a target field in the second target DCI according to a quantity X of target fields included in the second target DCI and a quantity Y of target fields that need to be interpreted for scheduling the target BWP further includes:

in a case that X is 0, assuming, by the terminal, that there is no corresponding target field on the target BWP.

In a possible implementation, that the parsing module 602 parses a target field in the second target DCI according to a quantity X of target fields included in the second target DCI and a quantity Y of target fields that need to be interpreted for scheduling the target BWP includes:

in a case that X is less than Y, assuming, by the terminal, that only X valid SRS resource sets on the target BWP are associated with X target fields in the second target DCI; and parsing the X target fields in the second target DCI according to the X valid SRS resource sets.

In a possible implementation, the X valid SRS resource sets include one of the following:

the first or last X valid SRS resource sets that are in a plurality of SRS resource sets configured on the target BWP and that are sorted according to a target order, where the target order includes one of the following:

a configuration order;

a descending order of index values;

an ascending order of index values; and an order associated with Y target fields.

In a possible implementation, that the parsing module 602 parses a target field in the second target DCI according to a quantity X of target fields included in the second target DCI and a quantity Y of target fields that need to be interpreted for scheduling the target BWP includes:

in a case that X is not equal to Y, parsing, by the terminal, one target field in the second target DCI, where the one target field includes one of the following:

a first target field in the second target DCI; and a target field corresponding to a target SRS resource set in the second target DCI, where the target SRS resource set is one of a plurality of SRS resource sets configured on the target BWP or activated BWP.

In a possible implementation, the target SRS resource set is one SRS resource set with a minimum index value in the plurality of SRS resource sets configured on the target BWP or activated BWP.

In a possible implementation, before parsing the target field in the second target DCI, the parsing module 602 is further configured to:

in a case that a first quantity of bits occupied by the target field in the second target DCI is less than a second quantity of bits occupied by the target field (that is, a target field in DCI on the target BWP) that needs to be interpreted for scheduling the target BWP, fill zero before a bit string of the target field in the second target DCI until a length of the bit string is the second quantity of bits; and/or in a case that the first quantity of bits is greater than or equal to the second quantity of bits, delete a part of the bits starting from a least significant bit of the bit string of the target field in the second target DCI, so that the length of the bit string is the second quantity of bits.

In a possible implementation, the target field includes at least one of the following:

a dynamic handover indicator field;

an SRI field;

a TPMI field;

a TPC field;

a phase tracking reference signal PTRS-demodulation reference signal DMRS association field; and an open-loop power control parameter set indicator.

In a possible implementation, an SRI field in the second target DCI correspondingly indicates an SRS resource in an SRS resource set configured on the activated BWP.

Figure 7:
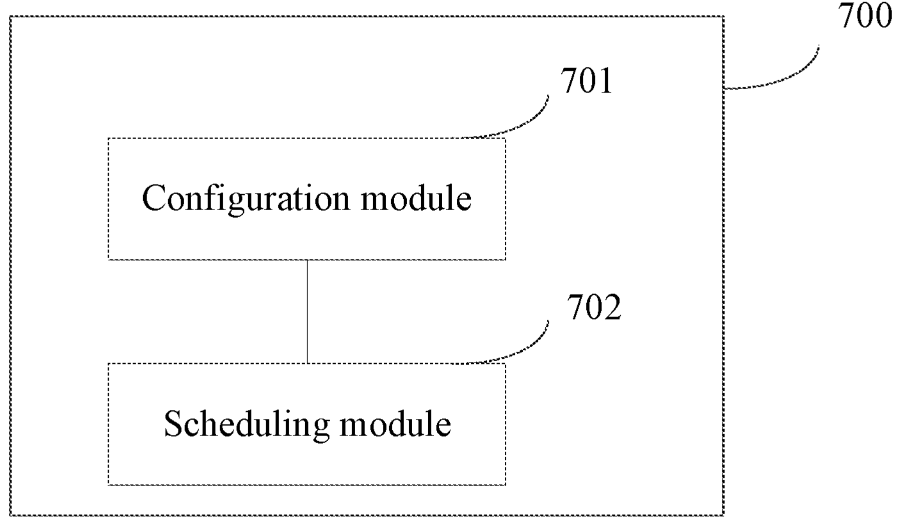
FIG. 7 is a schematic structural diagram of a scheduling apparatus according to an embodiment of this application.

FIG. 7 is a schematic structural diagram of a scheduling apparatus according to an embodiment of this application. As shown in FIG. 7, the apparatus 700 mainly includes a configuration module 701 and a scheduling module 702.

In this embodiment of this application, the configuration module 701 is configured to send configuration information to a terminal; and the scheduling module 702, configured to send first target DCI to the terminal according to the configuration information and a transmission parameter of a to-be-scheduled target uplink channel, where the first target DCI is used to schedule the target uplink channel, where the configuration information is used to indicate any one of the following: sounding reference signal SRS resource sets configured for different DCI formats, where the SRS resource set is used for codebook-based transmission or non-codebook-based transmission; a first instruction associated with a first resource, where the first resource includes at least one of the following: a control resource set, search space, and a DCI format; parameter information of the different DCI formats, where the parameter information includes at least one of the following: whether a target field exists, whether a second one field of the target field exists, and a size of the target field; and a configured grant.

In a possible implementation, the SRS resource sets configured for the different DCI formats include at least one first SRS resource set configured for a first DCI format and/or at least one second SRS resource set configured for a second DCI format, for example, at least one first SRS resource set configured for DCI format 0_1 and/or at least one second SRS resource set configured for DCI format 0_2.

In a possible implementation, that the scheduling module 702 sends first target DCI to the terminal according to the configuration information and a transmission parameter of a scheduled target uplink channel includes:

determining a target SRS resource configuration of the first target DCI according to the configuration information and a format of the first target DCI;

determining, according to a first quantity of SRS resource sets included in the target SRS resource configuration, a second quantity of target fields that are in the first target DCI and that indicate the transmission parameter of the target uplink channel, where the second quantity is less than or equal to the first quantity; and sending the first target DCI.

In a possible implementation, that the scheduling module 702 sends first target DCI to the terminal according to the configuration information and a transmission parameter of a scheduled target uplink channel includes:

in a case that the transmission parameter of the target uplink channel includes at least one set of transmission parameters, sending the first target DCI on the first resource associated with the first instruction; and in a case that the transmission parameter of the target uplink channel includes one set of transmission parameters, sending the first target DCI on a first resource that is not associated with the first instruction.

In a possible implementation, the parameter information of the different DCI formats includes parameter information of a third DCI format and parameter information of a fourth DCI format, for example, parameter information of DCI format 0_1 and parameter information of DCI format 0_2.

In a possible implementation, in a case that the target field includes a TPC field, the parameter information of the different DCI formats includes parameter information of a fifth DCI format and parameter information of a sixth DCI format, for example, parameter information of DCI format 1_1 and parameter information of DCI format 1_2.

In a possible implementation, that the scheduling module 702 sends first target DCI to the terminal according to the configuration information and a transmission parameter of a scheduled target uplink channel includes:

determining a target format of the first target DCI according to the transmission parameter of the target uplink channel and the parameter information of the different DCI formats; and sending the first target DCI in the target format.

In a possible implementation, in a case that target parameter information corresponding to the target format indicates that the target field does not exist, the target uplink channel is indicated to be transmitted by using an appointed transmission parameter; and in a case that the target parameter information indicates that the second one field of the target field does not exist, the target field in the first target DCI indicates all transmission parameters of the target uplink channel, or the target field in the first target DCI indicates a part of transmission parameters of the target uplink channel.

In a possible implementation, in a case that the parameter information includes the size of the target field, the parameter information may further include a correspondence between each code point of the target field and indication information and/or an activated target code point.

In a possible implementation, that the scheduling module 702 sends first target DCI to the terminal according to the configuration information and a transmission parameter of a scheduled target uplink channel includes:

in a case that the target uplink channel is a PUSCH corresponding to the configured grant, sending the first target DCI in a predetermined DCI format to the terminal, where the predetermined DCI format includes DCI format 0_0.

Figure 8:
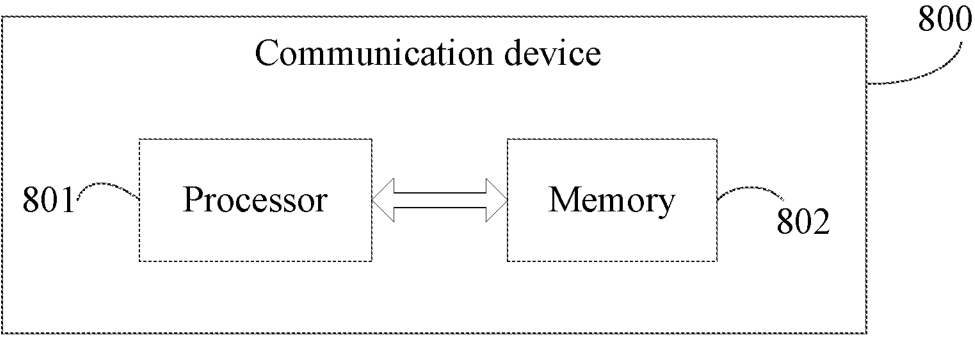
FIG. 8 is a schematic structural diagram of a communication device according to an embodiment of this application.

Optionally, as shown in FIG. 8, an embodiment of this application further provides a communication device 800, including a processor 801, a memory 802, and a program or an instruction that is stored in the memory 802 and that can be run on the processor 801. For example, when the communication device 800 is a terminal, the program or the instruction is executed by the processor 801 to implement the processes of the foregoing embodiment of the method 200 or the processes of the foregoing embodiment of the method 300, and a same technical effect can be achieved. When the communication device 800 is a network side device, the program or the instruction is executed by the processor 801 to implement the processes of the foregoing embodiment of the method 300, and a same technical effect can be achieved. To avoid repetition, details are not described herein again.

Figure 9:
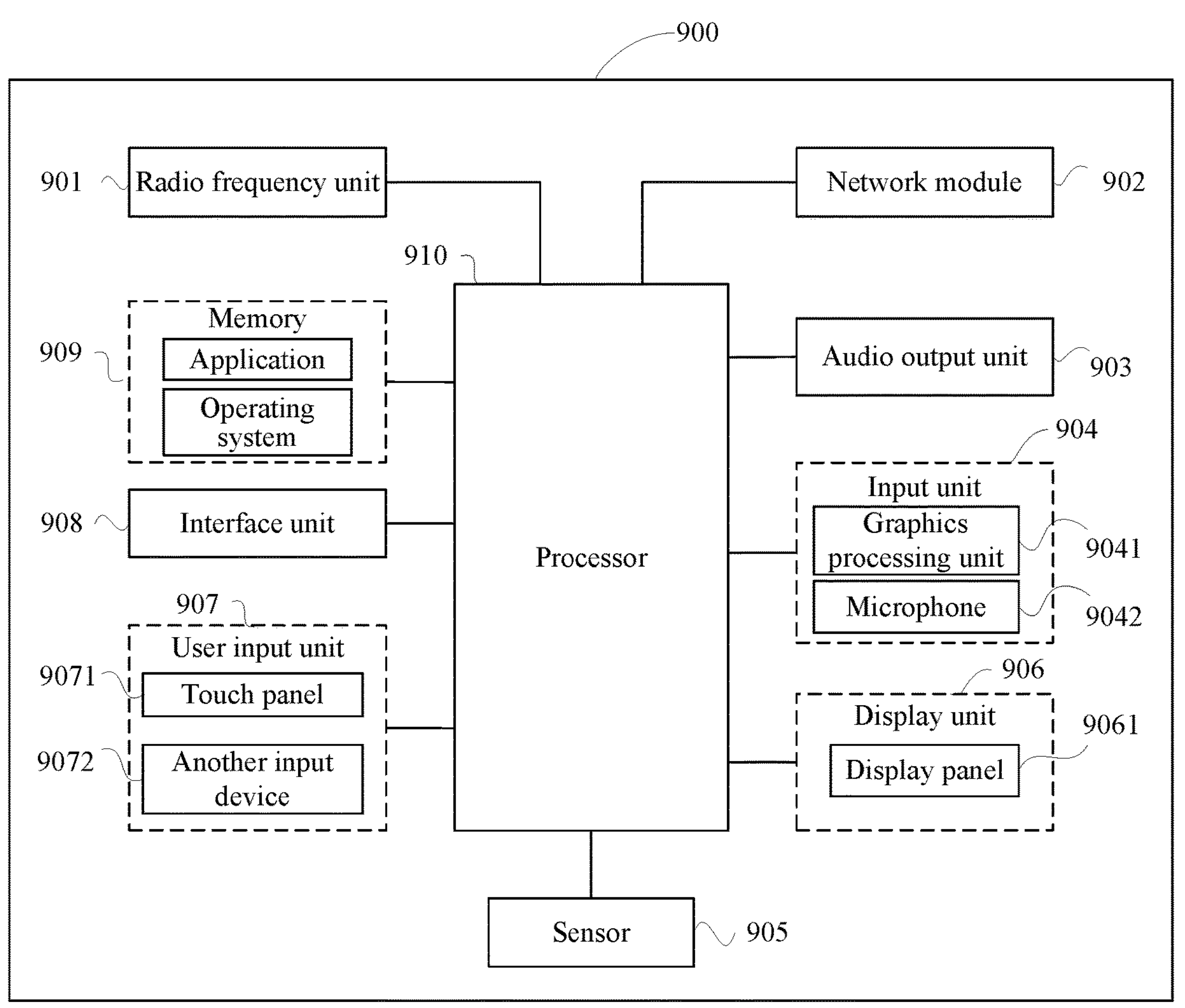
FIG. 9 is a schematic structural diagram of hardware of a terminal according to an embodiment of this application.

An embodiment of this application further provides a terminal, including a processor and a communication interface, where the processor is configured to implement the processes of the embodiment of foregoing method 200, or the processes of the foregoing embodiment of the method 300, and the communication interface is configured to communicate with a network side device. This terminal embodiment corresponds to the foregoing method embodiment on the terminal side. Each implementation process and implementation of the foregoing method embodiment may be applicable to this terminal embodiment, and a same technical effect can be achieved. Specifically, FIG. 9 is a schematic structural diagram of hardware of a terminal according to an embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art can understand that the terminal 900 may further include a power supply (such as a battery) that supplies power to each component. The power supply may be logically connected to the processor 910 by using a power supply management system, to implement functions such as charging and discharging management, and power consumption management by using the power supply management system. The terminal structure shown in FIG. 9 constitutes no limitation on the terminal, and the terminal may include more or fewer components than those shown in the figure, or combine some components, or have different component arrangements. Details are not described herein.

It should be understood that, in this embodiment of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. Optionally, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein.

In this embodiment of this application, the radio frequency unit 901 receives downlink data from a network side device and then sends the downlink data to the processor 910 for processing; and sends uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or an instruction and various data. The memory 909 may mainly include a program or instruction storage area and a data storage area. The program or instruction storage area may store an operating system, and an application or an instruction required by at least one function (for example, a sound playing function or an image playing function). In addition, the memory 909 may include a high-speed random access memory, and may further include a non-transient memory. The non-transient memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory, for example, at least one disk storage component, a flash memory component, or another non-transient solid-state storage component.

The processor 910 may include one or more processing units. Optionally, an application processor and a modem processor may be integrated into the processor 910. The application processor mainly processes an operating system, a user interface, an application, an instruction, or the like. The modem processor mainly processes wireless communications, for example, a baseband processor. It can be understood that, alternatively, the modem processor may not be integrated into the processor 910.

The processor 910 is configured to: obtain configuration information; and determine, according to the configuration information and detected first target downlink control information DCI, a transmission parameter of a target uplink channel scheduled by the first target DCI, where the configuration information is used to indicate any one of the following:

sounding reference signal SRS resource sets configured for different DCI formats, where the SRS resource set is used for codebook-based transmission or non-codebook-based transmission;

a first instruction associated with a first resource, where the first resource includes at least one of the following: a control resource set, search space, and a DCI format;

parameter information of the different DCI formats, where the parameter information includes at least one of the following: whether a target field exists, whether a second one field of the target field exists, and a size of the target field; and a configured grant.

Alternatively, the processor 910 is configured to: receive second target DCI, where a target BWP indicated by a BWP indicator field in the second target DCI is not an activated BWP; and parse a target field in the second target DCI according to a quantity X of target fields included in the second target DCI and a quantity Y of target fields that need to be interpreted for scheduling the target BWP, where X and Y are integers greater than or equal to 0.

This terminal embodiment corresponds to the foregoing method embodiment on the terminal. Each implementation process and implementation of the foregoing method embodiment may be applicable to this terminal embodiment, and a same technical effect can be achieved.

An embodiment of this application further provides a network side device, including a processor and a communication interface, where the processor is configured to implement the processes of the embodiment of the method 400, and the communication interface is configured to communicate with a terminal. This network side device embodiment corresponds to the foregoing method embodiment on the network side device. Each implementation process and implementation of the foregoing method embodiment may be applicable to this network side device embodiment, and a same technical effect can be achieved.

Figure 10:
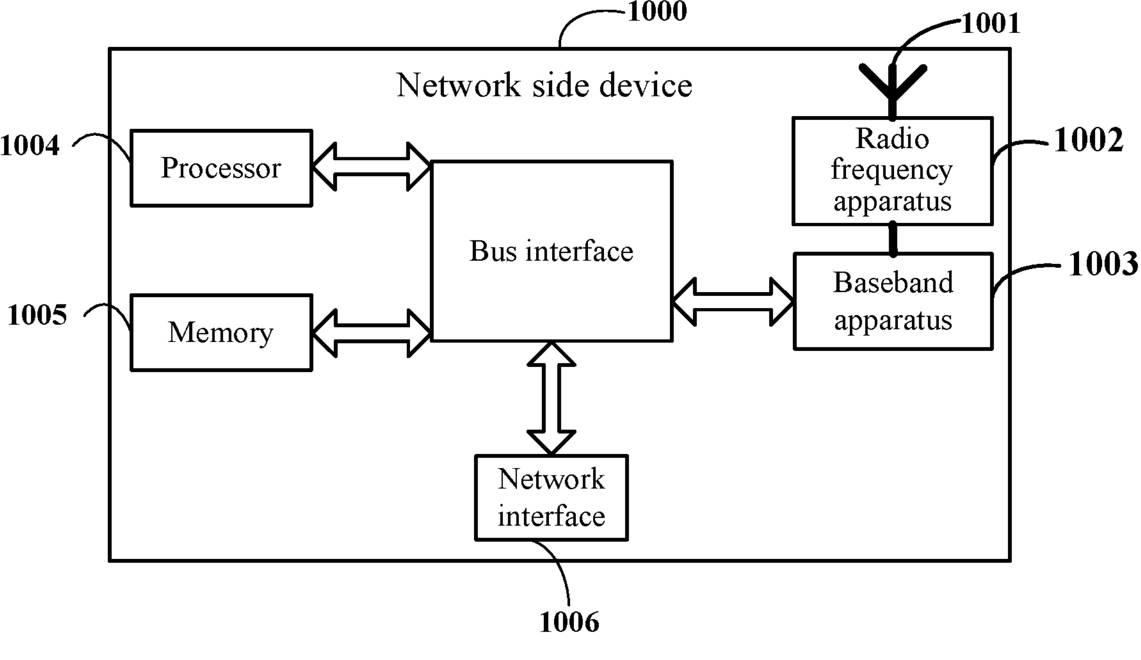
FIG. 10 is a schematic structural diagram of hardware of a network side device according to an embodiment of this application.

Specifically, an embodiment of this application further provides a network side device. As shown in FIG. 10, a network device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-sent information, and sends the information to the radio frequency apparatus 1002. The radio frequency apparatus 1002 processes the received information and then sends the information by using the antenna 1001.

The frequency band processing apparatus may be located in the baseband apparatus 1003. The method performed by the network side device in the foregoing embodiment may be implemented in the baseband apparatus 1003. The baseband apparatus 1003 includes a processor 1004 and a memory 1005.

The baseband apparatus 1003 may include, for example, at least one baseband board, where a plurality of chips are disposed on the baseband board. As shown in FIG. 10, one chip is, for example, the processor 1004, which is connected to the memory 1005, so as to invoke a program in the memory 1005 to perform operations of the network device shown in the foregoing method embodiment.

The baseband apparatus 1003 may further include a network interface 1006, configured to exchange information with the radio frequency apparatus 1002. For example, the interface is a common public radio interface (CPRIt).

Specifically, the network side device in this embodiment of the present disclosure further includes an instruction or a program that is stored in the memory 1005 and that can be run on the processor 1004. The processor 1004 invokes the instruction or the program in the memory 1005 to perform the method performed by the modules shown in FIG. 7, and a same technical effect is achieved. To avoid repetition, details are not described herein again.

An embodiment of this application further provides a readable storage medium. The readable storage medium stores a program or an instruction, and the program or the instruction is executed by a processor to implement the processes of the foregoing embodiment of the method for determining a transmission parameter of an uplink channel, the processes of the foregoing DCI parsing method embodiment, or the processes of the foregoing scheduling method embodiment, and a same technical effect can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing embodiment of the method for determining a transmission parameter of an uplink channel, the processes of the foregoing DCI parsing method embodiment, or the processes of the foregoing scheduling method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program/program product. The computer program/program product is stored in a non-transient storage medium, and the program/program product is executed by at least one processor to implement the processes of the foregoing embodiment of the method for determining a transmission parameter of an uplink channel, the processes of the foregoing DCI parsing method embodiment, or the processes of the foregoing scheduling method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A method for determining a transmission parameter of an uplink channel, comprising:

obtaining, by a terminal, configuration information; and determining, by the terminal according to the configuration information and detected first target downlink control information DCI, a transmission parameter of a target uplink channel scheduled by the first target DCI, wherein the configuration information is used to indicate:

sounding reference signal SRS resource sets configured for different DCI formats, wherein the SRS resource set is used for codebook-based transmission or non-codebook-based transmission;

wherein the SRS resource sets configured for the different DCI formats comprise at least one first SRS resource set configured for a first DCI format and at least one second SRS resource set configured for a second DCI format;

wherein a first index set is comprised in a second index set, wherein the first index set is an index set of an SRS resource configured in the first SRS resource set, and the second index set is an index set of an SRS resource configured in the second SRS resource set.

2. The method according to claim 1, wherein a first parameter of the first SRS resource set is the same as a first parameter of the second SRS resource set, wherein the first parameter is a parameter other than an index of an SRS resource in a configuration parameter of an SRS resource set.

3. The method according to claim 1, wherein an index set of the at least one second SRS resource set is comprised in an index set of the at least one first SRS resource set.

4. The method according to claim 1, wherein the determining, according to the configuration information and detected first target downlink control information DCI, a transmission parameter of a target uplink channel scheduled by the first target DCI comprises:

determining a target SRS resource configuration of the first target DCI according to the configuration information and a format of the detected first target DCI; and determining, according to a first quantity of SRS resource sets comprised in the target SRS resource configuration, to transmit the target uplink channel according to a transmission parameter indicated by a target field of a second quantity in the first target DCI, wherein the second quantity is less than or equal to the first quantity.

5. The method according to claim 1, wherein the configuration information is further used to indicate parameter information of the different DCI formats, wherein the parameter information comprises at least one of the following: whether a target field exists, whether a second one field of the target field exists, and a size of the target field.

6. The method according to claim 5, wherein the determining, according to the configuration information and detected first target downlink control information DCI, a transmission parameter of a target uplink channel scheduled by the first target DCI comprises:

determining target parameter information of the first target DCI according to the parameter information of the different DCI formats and a format of the first target DCI; and determining, according to the target parameter information, the transmission parameter of the target uplink channel scheduled by the first target DCI.

7. The method according to claim 6, wherein the determining, according to the target parameter information, the transmission parameter of the target uplink channel scheduled by the first target DCI comprises:

in a case that the target parameter information indicates that the target field does not exist, determining to transmit the target uplink channel by using an appointed transmission parameter; and in a case that the target parameter information indicates that the second one field of the target field does not exist, determine to transmit the target uplink channel by using a transmission parameter indicated by a target field in the first target DCI, or determine to transmit the target uplink channel by using a transmission parameter indicated by a target field in the first target DCI and an appointed transmission parameter.

8. The method according to claim 6, wherein in a case that the parameter information comprises the size of the target field, the parameter information may further comprise a correspondence between each code point of the target field and indication information and/or an activated target code point.

9. The method according to claim 1, wherein the configuration information further comprises a configured grant, the determining, according to the configuration information and detected first target downlink control information DCI, a transmission parameter of a target uplink channel scheduled by the first target DCI comprises:

in a case that a format of the first target DCI is a predetermined DCI format and the target uplink channel scheduled by the first target DCI is a PUSCH corresponding to the configured grant, determining the transmission parameter of the target uplink channel according to a target resource and a repetition parameter in the configured grant.

10. The method according to claim 9, wherein the determining the transmission parameter of the target uplink channel according to a target resource and a repetition parameter in the configured grant comprises one of the following:

in a case that a value of the repetition parameter is 1, determining that a power control parameter of the target uplink channel is a first set of power control parameters configured in the configured grant or one set of power control parameters with a minimum index value configured in the configured grant, or determining that a power control parameter of the target uplink channel is associated with one set of power control parameters of an SRS resource set with a minimum index value in SRS resource sets configured in the configured grant;

in a case that a value of the repetition parameter is 1, determining one target spatial relationship and/or one target path loss reference signal of the target uplink channel according to target information configured for or associated with the target resource, wherein the target information comprises at least one of the following: spatial information, a path loss reference signal, and a reference signal;

in a case that the value of the repetition parameter is greater than 1, determining a plurality of target spatial relationships and/or a plurality of target path loss reference signals of the target uplink channel according to the target information configured for or associated with the target resource;

wherein the target resource comprises:

a PUCCH resource with a minimum identifier configured for the terminal; or a CORESET with a minimum identifier configured for the terminal;

the one target spatial relationship is a spatial relationship with a minimum index value in at least one spatial relationship of the target resource, or the one target spatial relationship is determined based on a target reference signal, wherein the target reference signal is a reference signal corresponding to a target transmission configuration indicator TCI state associated with the target resource; and the one target path loss reference signal is an associated path loss reference signal in the spatial relationship with the minimum index value in the at least one spatial relationship of the target resource; or the one target path loss reference signal is determined based on the target reference signal.

11. A scheduling method, comprising:

sending, by a network side device, configuration information to a terminal; and sending, by the network side device, first target DCI to the terminal according to the configuration information and a transmission parameter of a to-be-scheduled target uplink channel, wherein the first target DCI is used to schedule the target uplink channel, wherein the configuration information is used to indicate:

sounding reference signal SRS resource sets configured for different DCI formats, wherein the SRS resource set is used for codebook-based transmission or non-codebook-based transmission;

wherein the SRS resource sets configured for the different DCI formats comprise at least one first SRS resource set configured for a first DCI format and at least one second SRS resource set configured for a second DCI format;

wherein a first index set is comprised in a second index set, wherein the first index set is an index set of an SRS resource configured in the first SRS resource set, and the second index set is an index set of an SRS resource configured in the second SRS resource set.

12. The method according to claim 11, wherein a first parameter of the first SRS resource set is the same as a first parameter of the second SRS resource set, wherein the first parameter is a parameter other than an index of an SRS resource in a configuration parameter of an SRS resource set.

13. The method according to claim 11, wherein an index set of the at least one second SRS resource set is comprised in an index set of the at least one first SRS resource set.

14. A terminal, comprising a processor, a memory, and a program or an instruction that is stored in the memory and can be run on the processor, wherein the program or the instruction is executed by the processor to implement following steps:

obtaining configuration information; and determining, according to the configuration information and detected first target downlink control information DCI, a transmission parameter of a target uplink channel scheduled by the first target DCI, wherein the configuration information is used to indicate:

sounding reference signal SRS resource sets configured for different DCI formats, wherein the SRS resource set is used for codebook-based transmission or non-codebook-based transmission;

wherein the SRS resource sets configured for the different DCI formats comprise at least one first SRS resource set configured for a first DCI format and at least one second SRS resource set configured for a second DCI format;

wherein a first index set is comprised in a second index set, wherein the first index set is an index set of an SRS resource configured in the first SRS resource set, and the second index set is an index set of an SRS resource configured in the second SRS resource set.

15. A network side device, comprising a processor, a memory, and a program or an instruction that is stored in the memory and can be run on the processor, wherein the program or the instruction is executed by the processor to implement the steps of the scheduling method according to claim 14.

16. The method according to claim 10, wherein the target TCI state is a TCI state with a minimum index value in a TCI state associated with the target resource; or wherein the target reference signal is a reference signal corresponding to a quasi co-location QCL of a type D associated with the target TCI state.

17. The method according to claim 1, wherein the determining, according to the configuration information and detected first target downlink control information DCI, a transmission parameter of a target uplink channel scheduled by the first target DCI comprises:

in a case that the first target DCI is detected on a first resource that is not associated with a first instruction, determining to transmit the target uplink channel by using a target transmission parameter, wherein the target transmission parameter comprises one set of transmission parameters indicated by one target field in the first target DCI or one set of appointed transmission parameters.

18. The method according to claim 17, wherein the target transmission parameter comprises one set of transmission parameters associated with a target SRS resource set, wherein the target SRS resource set is one of a plurality of SRS resource sets configured for the first target DCI.

19. The method according to claim 18, wherein the target SRS resource set is an SRS resource set with a minimum identifier in the plurality of SRS resource sets configured for the first target DCI.

20. The method according to claim 1, wherein the determining, according to the configuration information and detected first target downlink control information DCI, a transmission parameter of a target uplink channel scheduled by the first target DCI comprises:

in a case that the first target DCI is detected on the first resource associated with a first instruction, determining to transmit the target uplink channel by using a target transmission parameter, wherein the target transmission parameter comprises at least one set of transmission parameters indicated by at least one target field in the first target DCI or at least one set of appointed transmission parameters.

* * * * *